US007463192B2

(12) United States Patent
Gazit et al.

(10) Patent No.: US 7,463,192 B2
(45) Date of Patent: Dec. 9, 2008

(54) PHASED ARRAY ANTENNA FOR INDOOR APPLICATION

(75) Inventors: Mordechai Gazit, Jerusalem (IL); Shay Wasser, Tel Aviv (IL); Nathan Blaunshtein, Beer-Sheva (IL)

(73) Assignees: Wavextend Ltd., Kiryat Gat (IL); Detection and Protection Electronic Systems Ltd., Beer Sheva (IL)

( * ) Notice: Subject to any disclaimer, the term of this patent is extended or adjusted under 35 U.S.C. 154(b) by 0 days.

(21) Appl. No.: 10/574,789

(22) PCT Filed: Apr. 1, 2004

(86) PCT No.: PCT/IL2004/000301

§ 371 (c)(1), (2), (4) Date: Apr. 6, 2006

(87) PCT Pub. No.: WO2004/088787

PCT Pub. Date: Oct. 14, 2004

(65) Prior Publication Data

US 2006/0293013 A1 Dec. 28, 2006

(30) Foreign Application Priority Data

Apr. 3, 2003 (IL) ..................................... 155221

(51) Int. Cl.
*H01Q 3/02* (2006.01)
*H04B 7/14* (2006.01)
*H04M 1/00* (2006.01)

(52) U.S. Cl. ....................... 342/374; 455/15; 455/562.1

(58) Field of Classification Search ............................... 342/357.01-357.17, 374
See application file for complete search history.

(56) References Cited

U.S. PATENT DOCUMENTS

| | | | | |
|---|---|---|---|---|
| 4,490,721 | A * | 12/1984 | Stockton et al. | 342/368 |
| 5,952,922 | A * | 9/1999 | Shober | 340/572.4 |
| 5,982,334 | A | 11/1999 | Manasson et al. | |
| 6,141,561 | A * | 10/2000 | Izumiyama | 455/553.1 |
| 6,812,824 | B1 * | 11/2004 | Goldinger et al. | 340/10.1 |
| 7,020,701 | B1 * | 3/2006 | Gelvin et al. | 709/224 |
| 2001/0012277 | A1 * | 8/2001 | Campanella | 370/323 |
| 2003/0100343 | A1 * | 5/2003 | Zourntos et al. | 455/562 |
| 2003/0188252 | A1 * | 10/2003 | Kim et al. | 714/779 |
| 2004/0143428 | A1 * | 7/2004 | Rappaport et al. | 703/22 |
| 2004/0166802 | A1 * | 8/2004 | McKay et al. | 455/15 |

* cited by examiner

*Primary Examiner*—Thomas H. Tarcza
*Assistant Examiner*—Harry Liu
(74) *Attorney, Agent, or Firm*—AlphaPatent Associates Ltd.; Daniel J. Swirsky

(57) ABSTRACT

A novel phased array antenna assembly is hereto presented. This antenna is adapted for reducing severe radiation hazards to the human body, and is useful for transmitting and receiving signals while taking into account the indoor electromagnetic field strength. The antenna comprising a micro-strip small-size antenna; a switching device, having a communicating means with said antenna to select between receiving or transmitting modes, further having a selecting means for phase shift and the receiving/transmitting frequencies; a controller adapted to receive inputs from said switching device comprising; a coordinating means, adapted to interconnect said switching device with an algorithm-based software; and a memory queue. This antenna assembly is cost effective in the manner it is adapted for an indoor mass-utilization consisting of low cost materials and components, and further wherein said assembly radiates a limited electromagnetic field in a minimal measure required for communication.

12 Claims, 11 Drawing Sheets

PHASED ARRAY ANTENNA FOR INDOOR APPLICATION

CROSS-REFERENCE TO RELATED APPLICATIONS

This application is a U.S. National Phase Application under 35 U.S.C. 371 of PCT International Application No. PCT/IL2004/000301, which has an international filing date of Apr. 1, 2004, and which claims priority from Israel Patent Application No. 155,221, filed Apr. 3, 2003.

FIELD OF THE INVENTION

The present invention generally relates to a phased array antenna assembly, adapted for reducing severe radiation hazards to the human body. This antenna assembly is useful for transmitting and receiving signals while taking into account the indoor electromagnetic field strength. The present invention specifically relates to a phased array antenna assembly comprising the following three components: micro-strip small-size antenna, switching device and a controller. More specifically, and according to one particular embodiment of the present invention, the aforesaid phased array antenna assembly has proved useful in mirroring and/or doubling transmitted beams.

BACKGROUND OF THE INVENTION

Momentum gained in the last decade, including the introduction of mobile vehicular communication systems, is being fully exploited in an international effort to realize the personal communication services (PCS) of tomorrow. In the envisioned PCS, each subscriber carries a pocketsize communication device with an associated personal telephone number. An intelligent global network locates the individual and supervises two-way wireless transmissions which may involve speech, data, fax, and, video streams.

The most important aspect of PCS is wireless communication inside buildings, where people spend most of their time. In a typical wireless indoor application, transmission takes place over a radio link ranging from a few meters to a few tens of meters. Indoor radio propagation, however, is more complicated than transmission between an earth station and a spaceship millions of kilometers away. Signals received inside a building suffer from serious distortions caused by multipath dispersion, and are usually severely attenuated. The channel is dynamic, with its properties changing over space (motion of the portable unit itself) and over time (motion of people and objects around the wireless potable unit). Detailed characterization of the propagation medium is essential in successful design of indoor communication systems.

In a typical indoor portable wireless system, a basestation with a fixed antenna (AP) is installed in an elevated position and communicates with a number of portable/fixed radios (Stations) inside the building. Due to reflection and scattering of radio waves by structures inside a building, the transmitted signal most often reaches the receiver by more than one path, resulting in a phenomenon known as multipath fading. The signal components arriving from indirect paths and the direct path (if it exists) combine and produce a distorted version of the transmitted signal. In narrow-band transmission, the multipath medium causes fluctuations in the received signal envelope and phase. In wide-band pulse transmission, on the other hand, the effect is to produce a series of delayed and attenuated pulses (echoes) for each transmitted pulse. This is illustrated in FIGS. 1A and 1B, wherein the channel's responses at two points in the three-dimensional space are displayed. FIG. 1A presents a point with low delay spread, while FIG. 1B presents a point with a larger delay spread. Both analog and digital transmissions suffer from severe attenuation by the intervening structure. The received signal is further corrupted by other unwanted random effects: noise and co-channel interference.

Multipath fading seriously degrades the performance of communication systems operating inside buildings. Unfortunately, little can be done to eliminate multipath disturbances. However, if the multipath medium is well characterized, the transmitter and receiver can be designed to "match" the channel and to reduce the effect of; these disturbances. Detailed characterization of radio propagation is therefore a major requirement for successful design of indoor communication systems.

Propagation of radio waves inside a building is a highly complicated process. The impulse response approach described here can be used to characterize the channel. A study of the literature shows that the number of multipath components in each impulse response profile, N, is a random variable. Mean value of N is different for different types of buildings. The path variable sequences $\{a_k\}$, $\{t_k\}$, $\theta_k$ for every point in space are random sequences. The mean and variance of the distribution of $a_k$s are also random variables due to large-scale in homogeneities in the channel over large areas.

Adjacent multipath components of the impulse response profile are dependent. A standard Poisson hypothesis is inadequate to describe the arrival-time sequences. Adjacent amplitudes are likely to have correlated fading for high resolution measurements, since a number of scattering objects that produce them may be the same. Phase components for the same profile, however, are not correlated since at frequencies of interest their relative excess range is much larger than a wavelength. The amplitude sequence and the arrival-time sequence are correlated because later paths of a profile go through multiple reflections and hence experience higher attenuation.

The impulse response profiles for points that are close in space are correlated since the structure of the channel does not change appreciably over very short distances. Spatial correlation governs the amplitudes, the arrival-times and the phases, as well as the mean and variance of the amplitudes. There are small-scale local changes in the channel's statistics and large-scale global variations due to shadowing effects and spatial non-stationarities.

Path loss in an indoor environment is very severe most of the time. It is also very dynamic, changing appreciably over short distances. Simple path loss rules are successful in describing the mobile channel, but not the indoor channel.

The parameters of the channel depend greatly on the shape, size and construction of the building. Variations with frequency are also significant.

In its more general form the channel is non-stationary in time. Temporal variations are due to the motion of people and equipment around both antennas.

Any realistic channel model should consider the above factors. Furthermore, it should derive its parameters from actual field measurements rather than basing them on simplified theory.

A known and a convenient model for characterization of the indoor channel is the discrete-time impulse response (i.e., DTIR) model. In this DTIR model the time axis is divided into minor intervals called "bins". Each bin is assumed to contain either one multipath component, or no multipath component. The possibility of more than one path in a bin is excluded. A reasonable bin size is the resolution of the specific measurement since two paths arriving within a bin cannot be resolved as distinct paths. According to the DTIR model, each impulse response is described by a sequence of "0"s and "1"s (the path indicator sequence), wherein a "1" indicates the presence of a path in a given bin and a "0" represents the absence of a path in that bin. Each "1", has an associated amplitude and a phase value.

The advantage of this model is that it greatly simplifies any simulation process. It has been used successfully in the modeling and the simulation of the mobile-radio propagation-channel. Analysis of system performance is also easier with a discrete-time model, as compared to a continuous-time model.

When a single unmodulated carrier (constant envelope) is transmitted in a multipath environment, due to vector addition of the individual multipath components, a rapidly fluctuating CWS envelope is experienced by a receiver in motion. To deduce this narrow-band result from the above wide-band model we let s(t) of (4) be equal to 1. Excluding noise, the resultant CWS envelope R and phase $\phi$ for a single point in space are thus given by equation 1:

$$Re^{j\varphi} = \sum_{k=0}^{\infty} a_k e^{j\theta_k} \quad (1)$$

Sampling the channel's impulse response frequently enough, one should be able to generate the narrow-band CWS fading results for the receiver in motion, using the wide-band impulse response model.

The impulse response approach described in the previous section is supplemented with the geometrical model of FIG. 2. The signal transmitted from the base reaches the portable radio receivers via one or more main waves. These main waves consist of a line-of-sight, i.e., LOS (1) ray and several rays reflected (2) or scattered by main structures such as partitions (3), outer walls, floor (4), ceilings, etc. The LOS wave may be attenuated by the intervening structure to an extent that makes it undetectable. The main waves are randomized upon arrival in the local area of the portable. They break up in the environment of the portable due to scattering by local structure and furniture. The resulting paths for each main wave arrive with very short delays, experience about the same attenuation, but have different phase values due to different path lengths. The individual multipath components are added according to their relative arrival times, amplitudes, and phases, and their random envelope sum is observed by the portable. The number of distinguished paths recorded in a given measurement, and as a given point in space, depends on the shape and structure of the building, and on the resolution of the measurement setup.

The impulse response profiles collected in portable site i and portable site j of FIG. 3 are normally very different due to differences in the intervening (base to portable) structure, and differences in the local environment of the portables. FIG. 4 schematically presents stations/mobiles at different locations compared to the access point (i.e., 'AP') wherein some of the stations are mobile and some are stationary.

Variations in the statistics are now described. Let $$X_{ijk}(i=1, 2, \ldots, N; j=1, 2, \ldots, M; k=1, 2, \ldots, L) \quad (2)$$

be a random variable representing a parameter of the channel at a fixed point in three dimensional space. For example, $X_{ijk}$ may represent amplitude of a multipath component at a fixed delay in the wide-band model, amplitude of a narrow-band fading signal, the number of detectable multipath mean excess delay or delay spread, etc. The index k in $X_{ijk}$ numbers spatially adjacent points in a given portable site of radius 1-2 m. These points are very close (in the order of several centimeters or less). The index j numbers different sites with the same base-portable antenna separations, and the index i numbers groups of sites with different antenna separations.

With the above notations, there are three types of variations in the channel. The degree of these variations depends on the type of environment, distance between samples, and on the specific parameter under consideration. For some parameters, one or more of these variations may be negligible.

It is acknowledged that for small-scale variations, a number of impulse response profiles collected in the same "local area" or site are broadly similar since the channel's structure does not change appreciably over short distances. Therefore, impulse responses in the same site exhibit only variations in details. With fixed i and j, $X_{ijk}$ (k=1, 2, . . . , L) are correlated random variables for close values of k. This is equivalent to the correlated fading experienced in the mobile channel for close sampling distances.

It is further acknowledged that for mid-scale variations, this is a variation in the statistics for local areas with the same antenna separation. As an example, two sets of data collected inside a room and in a hallway, both having the same antenna separation, may exhibit great differences. If $\mu_{ij}$ denotes the mathematical expectation of $X_{ijk}$ (i.e., $\mu_{ij}=E_k(X_{ijk})$, where $E_k$ denotes expectation with respect to k), then for fixed i, $\mu_{ij}$ is a random variable. For amplitude fading, this type of variation is equivalent to the shadowing effects experienced in the mobile environment. Different indoor sites correspond to intersections of streets, as compared to mid-blocks.

It is lastly acknowledged that for large-scale variations, the channel's structure may change drastically, when the base to portable distance increases, among other reasons due to an increase in the number of intervening obstacles. As an example, for amplitude fading, increasing the antenna separation normally results in an increase in path loss. Using the previous terminology $\epsilon(d_i)=E_{jk}(X_{ijk})=E_j(\mu_{ij})$ is different for different $d_i$s, if $X_{ijk}$ denotes the amplitude, this type of variation is equivalent to the distance dependent path loss experienced in the mobile environment. For the mobile channel $\epsilon(d)$ is proportional to $d^{-n}$, where d is the base-mobile distance and n is a constant.

A comparison between the indoor and the mobile channels is now provided. The indoor and outdoor channels are similar in their basic features: they both experience multipath dispersions caused by a large number of reflectors and scatters. They can both be described using the same mathematical model. However, there are also major differences, briefly described in this section.

The conventional mobile channel (with an elevated base-station and low-level mobile/fixed station) is stationary in time and non-stationary in space. Temporal stationary is because signal dispersion is mainly caused by large fixed objects (buildings). In comparison, the effect of people and vehicles in motion are negligible. The indoor channel, on the other hand, is not stationary in space or in time. Temporal variations in the statistics of the indoor channel are due to the motion of people and equipment around the low-level portable antennas.

The indoor channel is characterized by higher path losses and sharper changes in the mean signal level, as compared to the mobile outdoor channel. Furthermore, applicability of a simple negative-exponent distance-dependent path loss model well established for the mobile channel is not universally accepted for the indoor channel.

Rapid motions and high velocities typical of the mobile users are absent in the indoor environment. The Doppler shift of the indoor channel is therefore negligible.

Maximum excess delay for the mobile channel is typically several microseconds if only the local environment of the mobile is considered, and more than 100 μs if reflection from distant objects such as hills, mountains, and city skylines is taken into account. The outdoor rms delay spreads are of the order of several μs without distant reflectors, and 10 to 20 μs with distant reflectors. The indoor channel, on the other hand, is characterized by excess delays of less than one μs and rms delay spreads in the range of several tens to several hundreds of nanoseconds (most often less than 100 ns). Therefore, for the same level of inter-symbol interference, transmission rates can be much higher in the indoor environments.

Finally, the relatively large outdoors-mobile transceivers are powered by the battery of the vehicle with an antenna located away from the mobile user. This is in contrast with lightweight portables normally operated close to the user's body. Therefore, much higher transmitted powers are feasible in the outdoors-mobile environment.

SUMMARY OF THE INVENTION

It is the purpose of the present invention to present a phased array antenna assembly, adapted for reducing severe radiation hazards to the human body. This antenna assembly is useful for transmitting and receiving signals while taking into account the indoor electromagnetic field strength. Said antenna design comprises the following three components: micro-strip small-size antenna, switching device and a controller. Significantly and most importantly, the said provided assembly is cost effectively adapted for indoor mass-utilization, consisting of low cost materials and components. Additionally, said assembly was proved to radiate a limited electromagnetic field in a minimal measure required for communication.

The said switching device has a communicating means with said antenna to select between receiving or transmitting modes. In addition, said switching device further possesses a selecting means for phase shift and the receiving/transmitting frequencies.

The aforementioned controller is adapted to receive inputs from said switching device. It is comprised of coordinating means and a suitable memory. The said coordinating means is adapted to interconnect said switching device with algorithm-based software. The said memory queue records the optimal path in each indoor environment to each of the associated nodes to said antenna assembly.

It is also in the scope of the present invention to provide the novel antenna as defined above, wherein the indoor electromagnetic field is located in a closed construction selected from house, apartment, large vehicle, aircraft or ship, industrial space, hospital or office and further wherein said closed construction comprises a plurality of openings. Additionally or alternatively, the said closed construction is preferably comprised of obstacles selected from corridors, floors, ceiling, windows, doors or any combination thereof. The openings are preferably selected from corridors, floors, ceiling, windows, doors or any combination thereof, and further wherein said openings are the wave guide slots.

It is further in the scope of the present invention wherein the antenna assembly defined above is characterized by the fact that that the path loss (L) of the electromagnetic radiation is calculated by the equation:

$$L_1 = 32.1 - 20\log_{10}(\chi|R_n|) - 20\log\left[\frac{1-(\chi R_n)^2}{1+(\chi R_n)^2}\right] + 17.8\log_{10}(X) + 8.6\log_{10}\left\{-\ln|R_n\chi|\cdot\left(\frac{\pi n}{d}\right)\cdot\left(\frac{X}{\rho_{bn}^{(0)}d}\right)\right\}$$

wherein n is the mode number; Rn is the reflection factor for mode number n, and Kn is the wave $$R_n = \frac{K_n - kZ_{EM}}{K_n + kZ_{EM}}$$

number for mode n, ρ—(Rho) denoted as any other received signal like S(t) before and X is the real part of the channel output Y. More specifically, said antenna assembly is potentially characterized by the fact that Rn is the reflection factor for mode number n, and Kn is the wave number for mode n. Additionally or alternatively, the aforementioned antenna assembly is characterized by the fact that the antenna creates a main beam lobe, in such a manner that Pant=P0+Pls and Pls=f(L1*Krssi); wherein P0–0 dBm, and Pls–Path loss to the mobile.

It is also in the scope of the present invention wherein an ASIC protocol controls the antenna operation in such a manner that the antenna is adapted to fit with any RF protocol. Thus, according to one embodiment of the present invention, the said ASIC may comprise an algorithm consisting of the following steps: (a) scanning with the first beam for first station; (b) receiving a signal and writing the RSSI; (c) proceeding to next beam direction; (d) getting a max. RSSI or received field strength from said station; (e) calculating the station virtual distance from the said antenna and adjusting the power level to the correct one; (f) registering the obtained RSSI and/or level in a memory, wherein the obtained is associated with the beam direction and with the station ID; and then (g) scanning for a plurality of other stations as required (See FIG. 6). Preferably, said sequence additionally consists of the step of proceeding with other receiving and/or transmitting tasks.

According to a particular embodiment of the present invention, the antenna assembly as defined above is characterized by the fact that the calculating step is based on the electromagnetic radiation equation:

$$L_1 = 32.1 - 20\log_{10}(\chi|R_n|) - 20\log\left[\frac{1-(\chi R_n)^2}{1+(\chi R_n)^2}\right] + 17.8\log_{10}(X) + 8.6\log_{10}\left\{-\ln|R_n\chi|\cdot\left(\frac{\pi n}{d}\right)\cdot\left(\frac{X}{\rho_{bn}^{(0)}d}\right)\right\}$$

wherein n is the mode number; Rn is the reflection factor for mode number n, and Kn is the wave number for mode n.

It is also in the scope of the present invention to provide a useful antenna assembly, characterized by the fact that the antenna used is a cell-wall socket (CWS). Preferably, according to another preferred embodiment of the present invention, the antenna assembly is adapted to indoor utilizations, wherein either the antenna or its associated clients are interconnected to at least one common network.

It is also in the scope of the present invention wherein the network is implemented in a plurality of closed constructions, in such a manner that a network of one closed construction is in communication with at least one other network located in at least one other closed construction, and wherein a master operator (e.g., said CWS) coordinates and/or communicates between a plurality of sub-networks.

It is also in the scope of the present invention wherein the antenna assembly as defined above, is characterized by the fact that while one master CWS is busy with an on-going session, selected from any fax, voice, data transaction or any combination thereof, another CWS is used as the coordinating master.

According to another aspect of the present invention, the calling device will identify itself by means of its personal identification number (PIN) to the CWS. The free CWS will install the PIN as the calling party number for the exchange. This will cause correct billing of the PIN owner.

It is still according to the main core of the present invention, wherein the aforementioned antenna assembly comprises a phased array antenna. Said antenna is comprised of n by m elements with horizontal-vertical and circular polarization. Hence, the present invention claims a phased array antenna, as schematically presented in the appended figures, and especially as described and defined in FIG. 9 and FIG. 10.

It is further according to another aspect of the present invention, wherein a broadband antenna assembly, as defined in any of the above, is adapted to operate at a frequency within the band gap of about 900 Mhz to about 6 Ghz. More particularly, said broadband antenna is adapted to operate at a frequency within the band gap of about 2.4 GHz to about 5.8 Ghz.

It is another object of the present invention to provide an antenna assembly as defined in any of the above, especially adapted for mirroring a plurality of main beam lobes. The symmetry of the mirrored beams is referred to at least one predetermined axis of the plate that comprises the element array. It is according to one embodiment of the present invention that the aforesaid axis is perpendicular to the plate that comprises the element array.

It is another object of the present invention to provide a phased array antenna, as defied in any of the above, wherein at least a portion of the switching modules is in series. Alternatively or additionally, at least a portion of said switching modules is parallel.

It is another object of the present invention wherein the switching module is an electronic circuit comprising inter alia a plurality of p RF signal inlets, a plurality of q RF signal outlets and a plurality of p+q diodes, wherein q and q are any positive integer numbers; in such a manner that each of said p+q diodes interconnects one of the q inlets with n outlets; wherein n is any positive integer so that $1 \leqq n \leqq q$; and/or more specifically, wherein p=q=2n.

It is another object of the present invention wherein the switching module is an electronic circuit comprising inter alia a plurality of p RF signal inlets, a plurality of q RF signal outlets and a plurality of p+q−1 diodes; wherein q and p are any positive even integer numbers; each of said p+q diodes interconnects one of the q inlets with n outlets wherein is $1 \leqq n \leqq q$ so that at least one beam is not mirrored.

It is another object of the present invention wherein the switching module is an electronic circuit comprising inter alia al plurality of q+1 RF signal inlets, a plurality of q+1 RF signal outlets and a plurality of (p+1)q diodes; wherein q is any even integer number in such a manner that each of said pq diodes interconnects one of the q inlets with p outlets; wherein a single central beam is not mirrored; wherein p is an integer number, and further wherein is $1 \leqq p \leqq q$.

It is another object of the present invention tp provide a useful antenna system, especially adapted for mirroring a plurality of L main beam lobes; the symmetry of the mirrored beams is referred to a predetermined axis of the plate that comprises the element array; said antenna comprising inter alia p RF input/outputs; the q inlets are interconnected with j outlets by means of each of said p+q diodes; at least one RF switch; a plurality of 1: L splitter modules; an array of n by m elements with horizontal-vertical and or circular polarization and a plurality of s switching modules adapted for mirroring said plurality of L main beam lobes; wherein s, L, D are denoted as the signal, beam and diodes and further wherein n, m, i and j are any positive integer numbers, and so that is=2iB=4iD.

Lastly, it is another object of the present invention to provide a novel and cost-effective switching module which is especially adapted to double RF signals in power of p. The module, e.g., module (1110) presented schematically in FIG. 11, is comprised inter alia of a plurality of q RF signal inlets, a plurality of q RF signal outlets and a plurality of q diodes; wherein q is any integer number in such a manner that each of said q diodes interconnects one of the q inlets with pq outlets; wherein p is an integer number, and wherein is $1 \leqq p \leqq q$.

BRIEF DESCRIPTION OF THE FIGURES

In order to understand the invention and to see how it may be carried out in practice, a preferred embodiment will now be described, by way of non-limiting example only, with reference to the accompanying drawings, in which FIG. 1A schematically presents a point with low delay spread while

DETAILED DESCRIPTION OF THE INVENTION

Figure 1A:
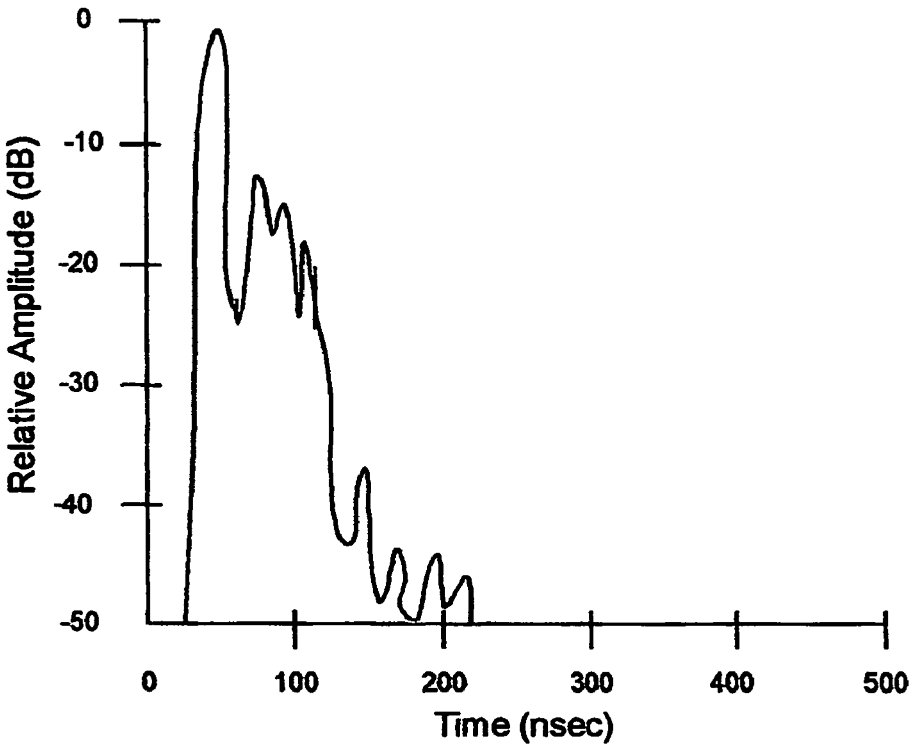
FIG. 1*b* presents a point with a larger delay spread.
Figure 1B:
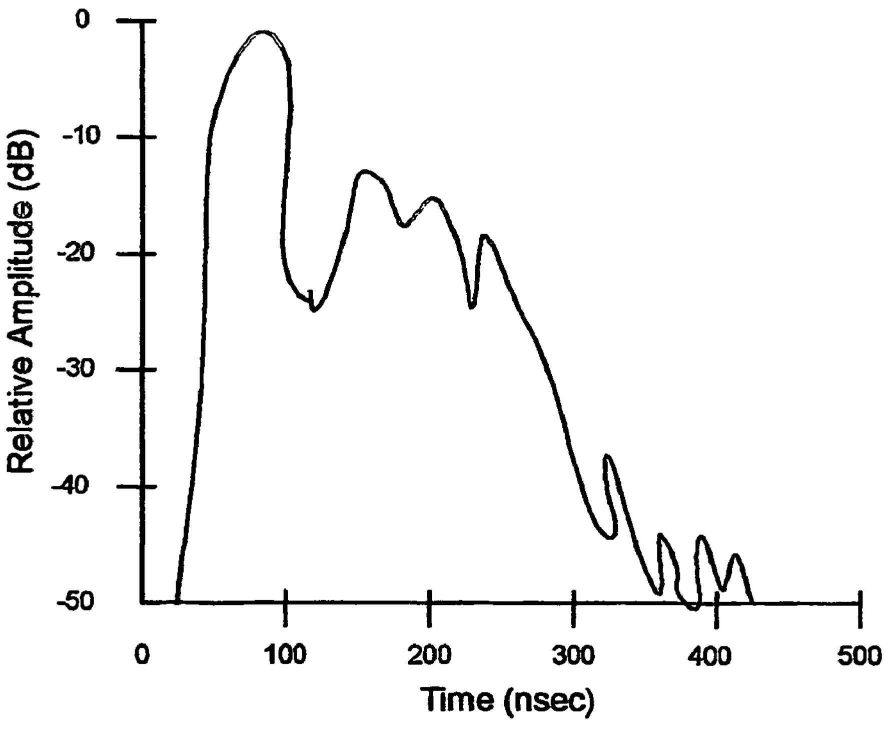
Figure 2:
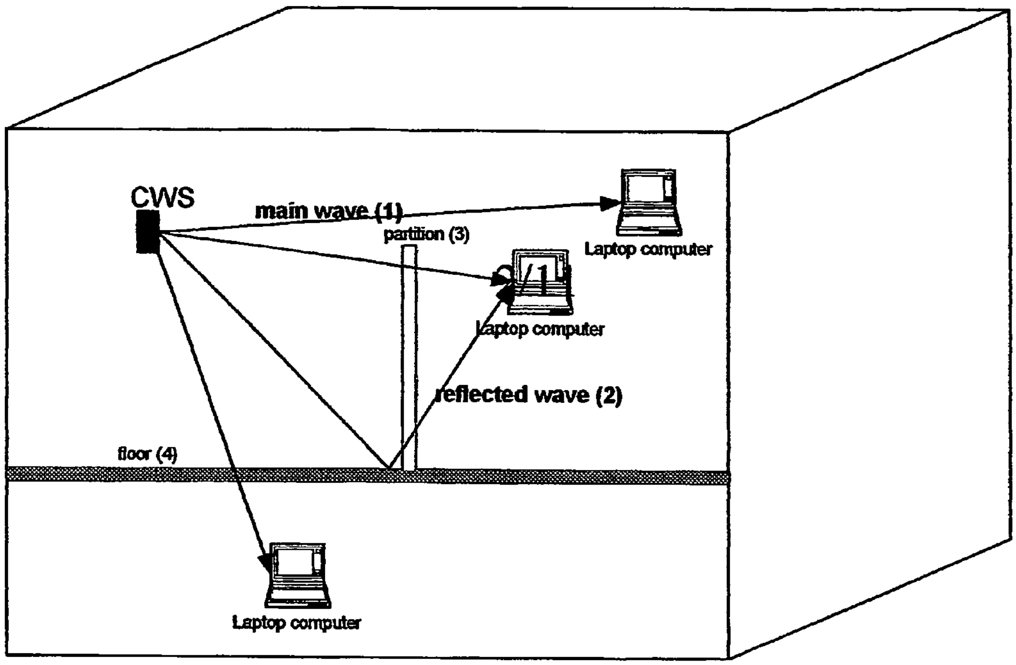
FIG. 2 schematically presents multipath from one CWS to three Stations.
Figure 3:
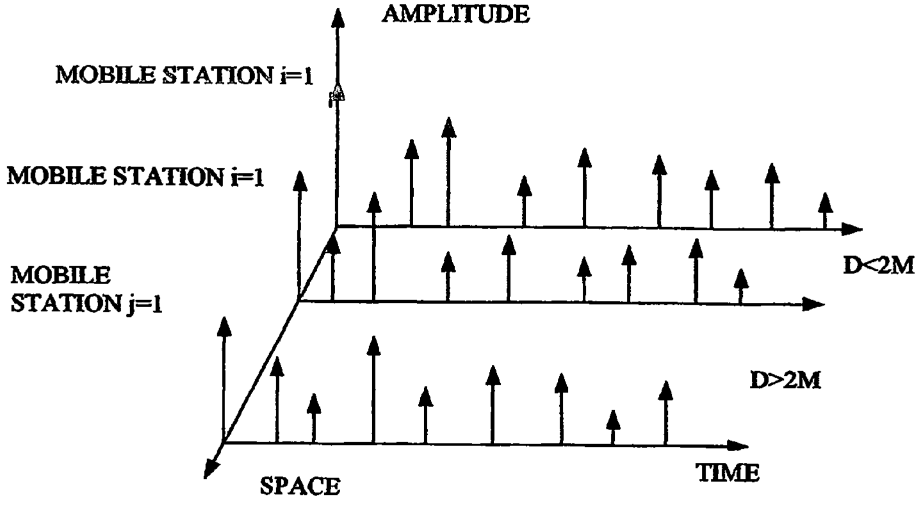
FIG. 3 schematically presents a time varying power at different signal level.
Figure 4:
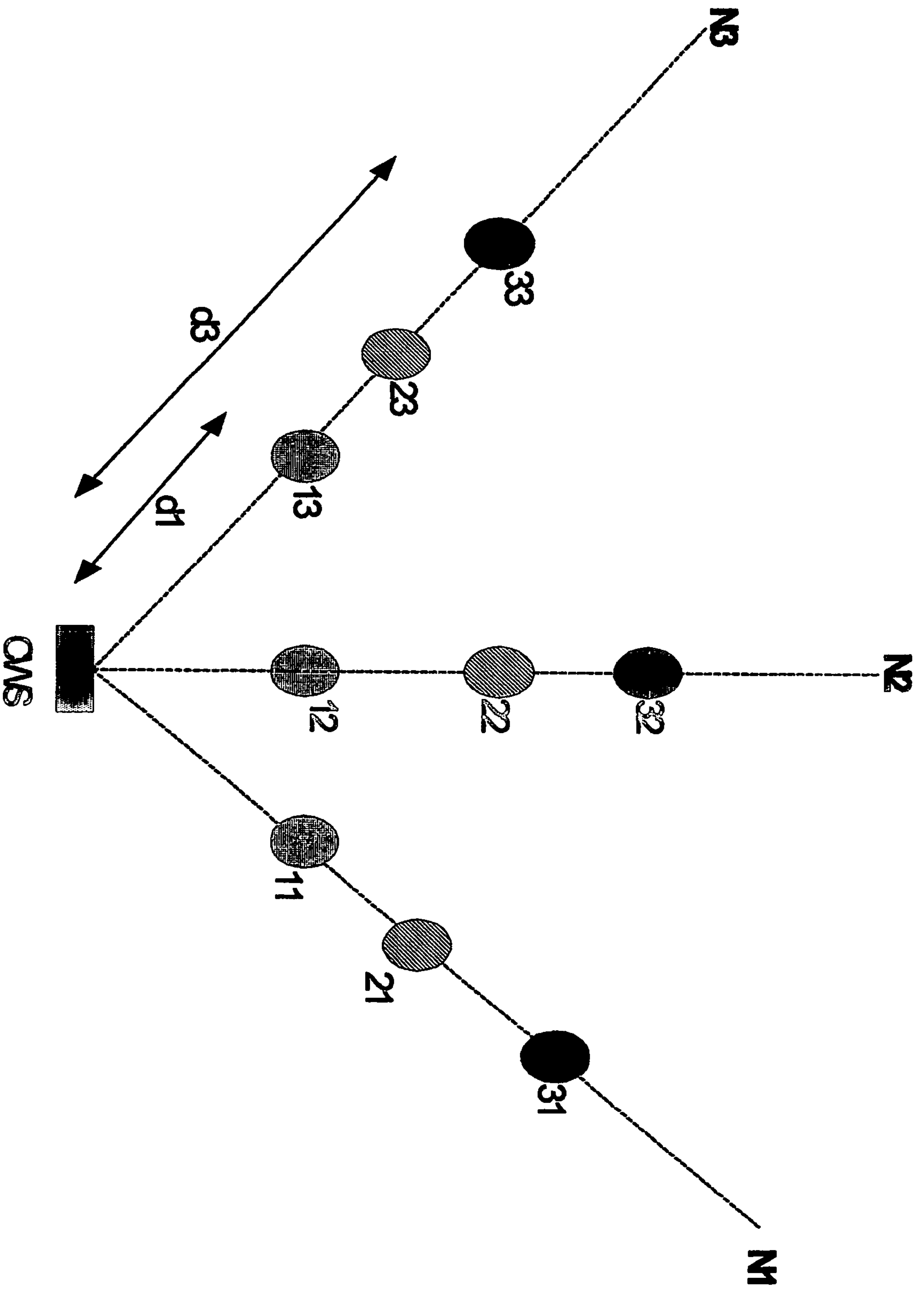
FIG. 4 schematically presents stations/mobiles at different locations compared to the AP.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide the antenna assembly as defined and described below.

This invention allows any fixed or portable device to adjust the phased array switching antenna beam directly to the source of the communication and calculate the exact power needed to reach the desired destination with the included equations. To date, the solution will cost below 10 dollars in mass production.

The present invention provides a mathematical modeling of the channel. Thus, the novel impulse response approach is hereto presented. The complicated random and time-varying indoor radio propagation channel can be modeled in the following manner: for each point in the three-dimensional space, the channel is a linear time-varying filter with the impulse response given by equation 3:

$$h(t,\tau)=\sum_{k=0}^{N(\tau)-1} a_k(t)\delta[\tau-\tau_k(t)]e^{j\theta_k(t)} \tag{3}$$

wherein t and $\tau$ are the observation time and application time of the impulse, respectively, $N(\tau)$ is the number of multipath components, $\{a_k(t)\}$, $\{\tau_k(t)\}$, $\{\theta_k(t)\}$ are the random time varying amplitude, arrival-time, and phase sequences, respectively, and $\delta$ is the delta function.

The channel is completely characterized by these path variables. This mathematical model is illustrated below. It is a wide-band model, which has the advantage that, because of its generality, it can be used to obtain the response of the channel to the transmission of any transmitted signal s(t) by convolving s(t) with h(t) and adding noise.

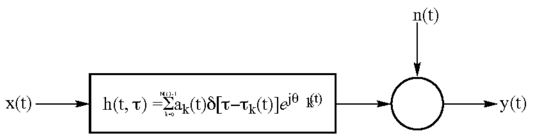

The time-invariant version of this model has been used successfully in mobile radio applications. For the stationary (time-invariant) channel, equation (4) is reduced to:

$$h(t)=\sum_{k=0}^{N(\tau)-1} a_k\delta[t-t_k]e^{j\theta_k} \tag{4}$$

The output y(t) of the channel to a transmitted signal s(t) is therefore given by equation 5:

$$y(t)=\int_{-\infty}^{\infty} s(\tau)h[t-\tau]\,d\tau+n(t) \tag{5}$$

where n(t) is the low-pass complex-valued additive Gaussian noise. With the above mathematical model, if the signal:

$$x(t)=Re\{s(t)e^{j\omega_0 t}\} \tag{6}$$

is transmitted through this channel environment (wherein s(t) is any low-pass signal and $\omega_0$ is the carrier frequency), the signal $$y(t)=Re\{\tau(t)e^{j\omega_0 t}\} \tag{7}$$

is received, where instead of the integral we can write equation 8:

$$\rho(t)=\sum_{k=0}^{N-1} a_k s[t-t_k]e^{j\theta_k}+n(t) \tag{8}$$

In a real-life situation, a portable receiver moving through the channel experiences a space-varying fading phenomenon. One can therefore associate an impulse response "profile" with each point in space. It should be noted that profiles corresponding to points close in space are expected to be broadly similar because principle reflectors and scatters, which give rise to the multipath structures, remain approximately the same over short distances.

The Indoor Electromagnetic Equations

Thus, most surprisingly, a novel and most effective microstrip small-size and low-cost phased array antenna design is provided by the present invention. Said antenna design, which takes into account the indoor electromagnetic field strength is hence hereto presented. The normal house, apartment or office is divided into areas that are similar to a waveguide. The doors and windows are the waveguide slits. The path loss is calculated by the following new equations (9-10):

$$L_1 = 32.1 - 20\log_{10}(\chi|R_n|) - 20\log\left[\frac{1-(\chi R_n)^2}{1+(\chi R_n)^2}\right] + 17.8\log_{10}(X) + 8.6\log_{10}\left\{-\ln|R_n\chi|\cdot\left(\frac{\pi n}{d}\right)\cdot\left(\frac{X}{\rho_{bn}^{(0)}d}\right)\right\} \tag{9}$$

wherein n is the mode number; L is the path loss is dB; Rn is the reflection factor for mode number n; and Kn is the wave number for mode n.

$$R_n=\frac{K_n-kZ_{EM}}{K_n+kZ_{EM}} \tag{10}$$

The antenna creates a main beam lobe that has only the right amount of field strength, which is calculated by (11):

$$Pant=P0+Pls$$

$$Pls=f(L1*Krssi) \tag{11}$$

wherein: P0-0 dBm (i.e, 1 mWatt/50 Ohm) and Pls-Path loss to the mobile.

In this way the antenna radiates only to the desired direction and does not pollute the whole space with unnecessary radiation. Secondly, the radiated power is always the only power that is needed to get to the certain mobile or fixed device and not more. This directed power is hence provided in order to reduce the human body exposure to EM radiation.

ASIC Protocol

Figure 5:
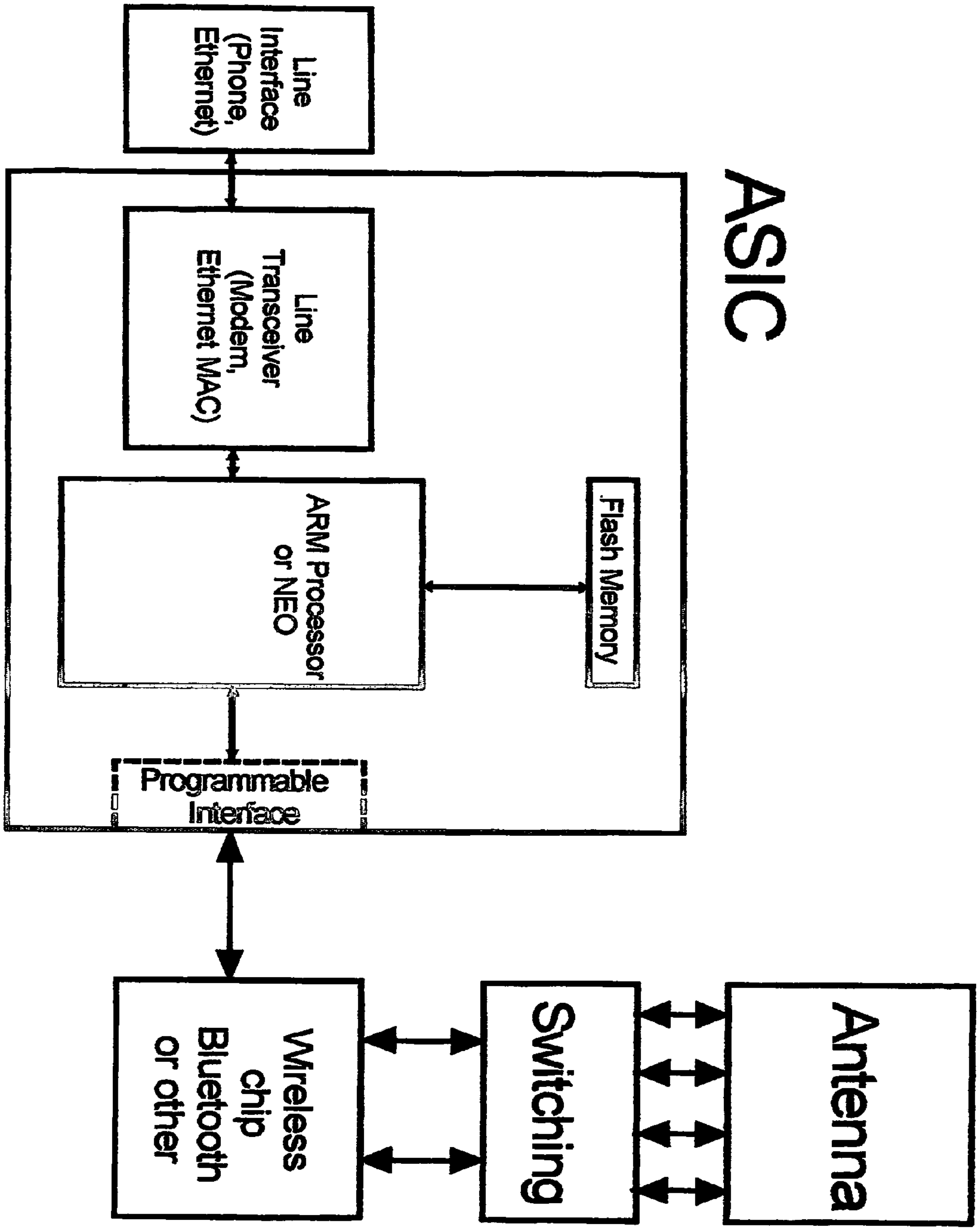
FIG. 5 schematically presents the ASIC and antenna block diagram.

FIG. 5 presents the ASIC and antenna block diagram. The ASIC includes the interfaces, processor and flash memory wherein the specific software for the antenna-switching algorithm resides. Flash Memory is referred to in the present invention as a variant on EEPROMs where banks of the chip are erased at once. This type of chip has become popular for computer ROMs, offering "easy" field reprogramming. The term ASIC refers to the known Application-Specific Integrated Circuit. The terms ARM or NEO refer to any commercially available microprocessor useful also for computing devices. Lastly, the term MAC (Media Access Control) address refers to a unique hardware number of a device.

Figure 6:
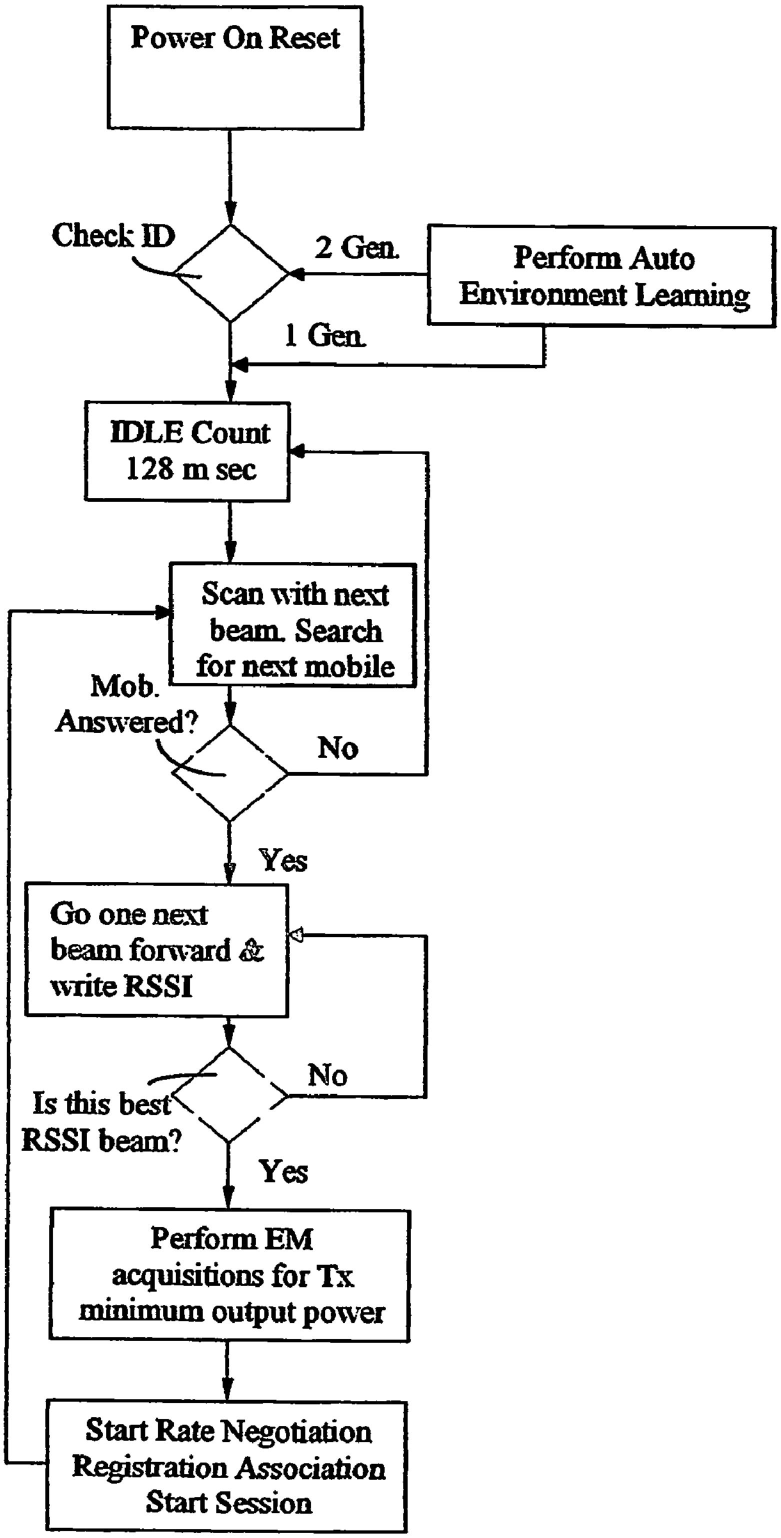
FIG. 6 schematically presents an ASIC protocol controlling the antenna operation.

Reference is made now to FIG. 6, presenting an ASIC protocol which controls the antenna operation. The ASIC and the antenna are adapted to fit with any RF protocol. A block diagram of the ASIC and the antenna are shown in the following block diagram:

The ASIC sends a control word to change the beam direction to the RF antenna head when the channel is not the optimum one, and in case of active scanning for a new mobile/ or fixed station.

The ASIC performs the following MBF algorithm:

1. Scan with the first beam for first station;
2. If receives a signal, write the RSSI;
3. Go to next beam direction;
4. Get maximum. RSSI or received field strength from that station;
5. Calculate the station virtual distance from the CWS using the electromagnetic equations as defined above, preferably in eq. (9);
6. Adjust the power level to the correct one;
7. Register in a table, the beam direction associated with that station ID;
8. Scan for next station; and,
9. After scan complete, proceed with other Rx/Tx tasks.

It is acknowledged in this respect that the smart antenna as defined in paragraph (e) is preferably a cell-wall socket (CWS) product. Hence, the said CWS is a wall-installed unit, comprising the element as defined in any of the above.

Figure 7:
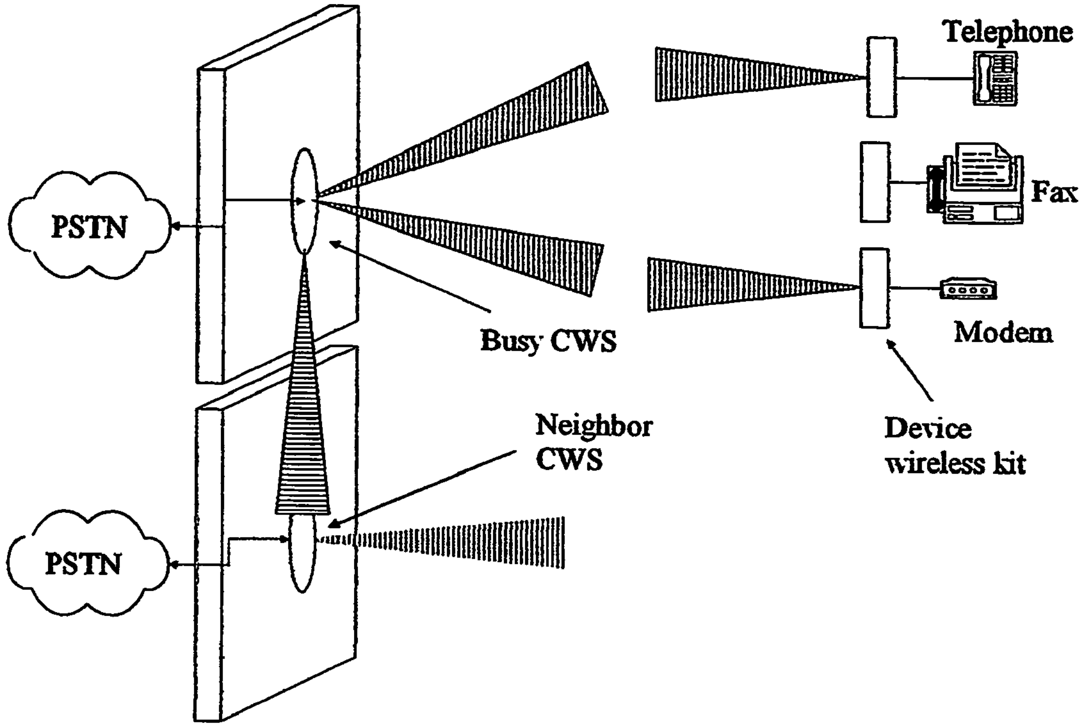
FIG. 7 schematically presents several CWS nodes which form a master to master Ad-hoc network.

Wireless Pico Net Master to Master Ad-hoc Association:

The present invention generally relates to any indoor utilizations, wherein the indoor electromagnetic field radiated by either the aforementioned antenna or any of its clients is located in a closed construction selected from house, apartment, large vehicle, aircraft or ship, industrial space or office, and further wherein said closed construction comprises a plurality of openings. It is acknowledged in this respect that either the antenna or its associated clients are interconnected to a common network, denoted herby by the short term 'network'. Reference is hence made to FIG. 7, schematically presenting several CWS nodes, which form a master-to-master ad-hoc network.

It is further in the scope of the present invention wherein said network is implemented in a plurality of closed constructions, as defined above, such that a network of one closed construction is to be in communication with at least one another network located in at least one other closed construction. A master CWS coordinates and/or communicates between those sub-networks. Thus, said master CWS comprises a plurality of master CWS connections, hereto denoted in the present invention by the term "Trunk On Demand" (i.e., TOD).

Figure 8:
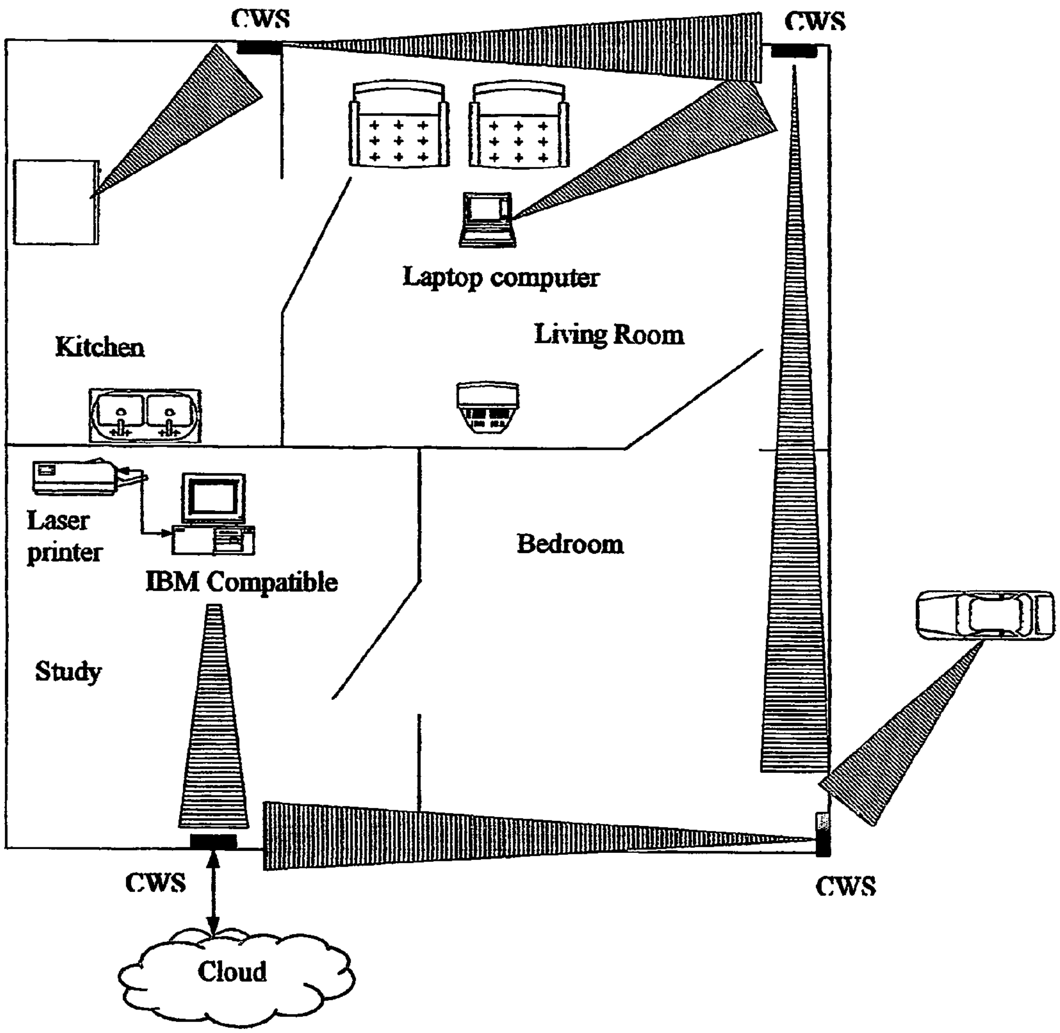
FIG. 8 schematically presents a whole apartment with three typical applications.

The TOD feature is required in case one master CWS is busy with an on-going session. A session can be selected from any fax/voice/data transaction. The TOD feature comes into effect only if there is another master CWS in the transmission range of the original master CWS. This other master CWS can be a second line in the same house, a close neighbor in the apartment above or below or another repeater CWS. The collection of close range connected master CWSs comprises the campus network. Any call/transaction will hop from one busy cell to the next looking for the first non-busy twisted pair towards the exchange. The calling device will identify itself with its personal identification number (PIN) to the CWS. The free CWS will install the PIN as the calling party number for the exchange. This will cause correct billing of the PIN owner. Reference is hence made to FIG. 8 showing a CWS nodes call routing.

The CWS units that are based on the propagation model as defined above and the smart antenna as similarly defined above will be installed in the walls of the building. The CWS nodes will detect each other and compose the indoor wireless network. If one of the units is a CWS bridge then the network will have a way to communicate with the outside world as shown in FIG. 8. The smart antenna will increase this range and the link will be able to penetrate walls. In order to cover a whole apartment or a building with pico-cell based CWS nodes we need to place a node every several tens of meters, such that each CWS AP can communicate with at least one other CWS. A whole apartment with three typical applications is shown in FIG. 8. The applications are: cellular call is routed towards CWS from the car, printing from a laptop in the living room, and a refrigerator with an embedded internet enabled device. The CWS AP Master to Master nodes connections are marked in red. The end points are marked with blue links.

Figure 9:
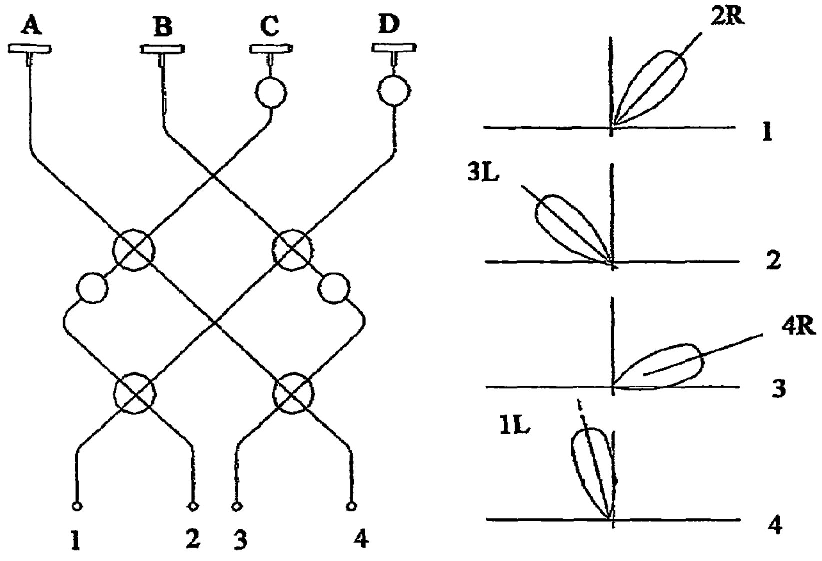
FIG. 9 schematically presents a CWS phased array antenna comprised of four horizontal radiating elements denoted by the letters A;B;C;D.
Figure 10:
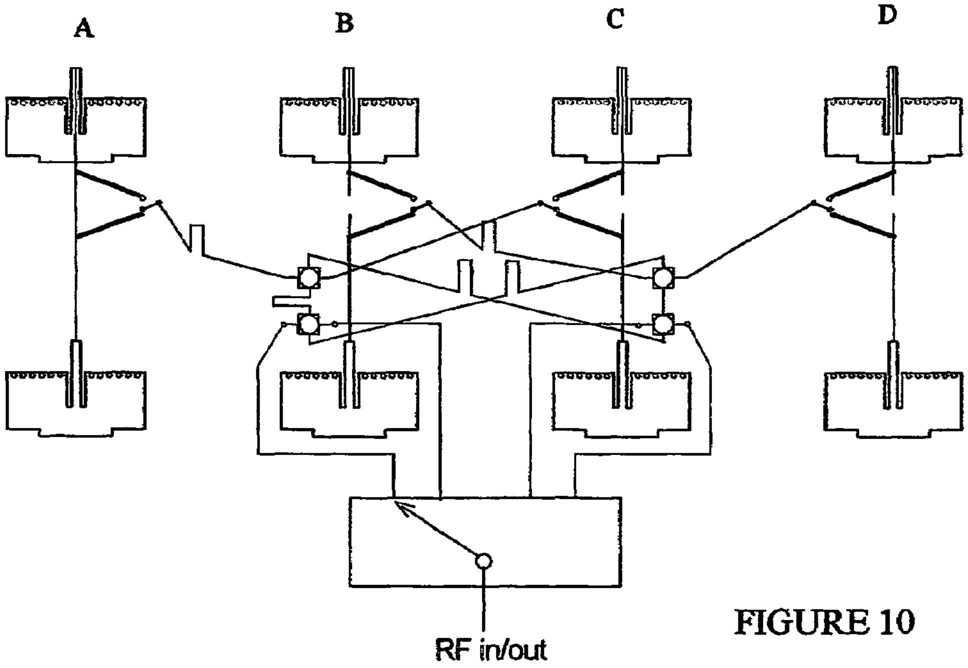
FIG. 10 schematically presents an indoor phased array antenna.

Reference is made now to FIG. 9, presenting a CWS phased array antenna comprised of four horizontal radiating elements denoted by the letters A;B;C;D;. The crossed circles represent hybrids and the plain circles represent phase shifting devices. As a result of inputting RF into one or more of the ports (1;2;3;4) a different directional beam is formed as denoted by the drawings on the right. Similarly, FIG. 10 schematically presents an indoor phased array antenna.

Although the block diagram is drawn for four horizontal elements, it represents a general form of n by m antenna elements, which will be realized according to changing needs in different CWS masters. It is acknowledged that according to one embodiment of the present invention, the antenna element is a basic radiating/receiving element and could be configured to horizontal/vertical/circular polarization. This drawing shows an example of the realization with eight elements (4 by 2), which may produce eight or more different beams according to the switching of the RF into the different inputs.

Figure 11:
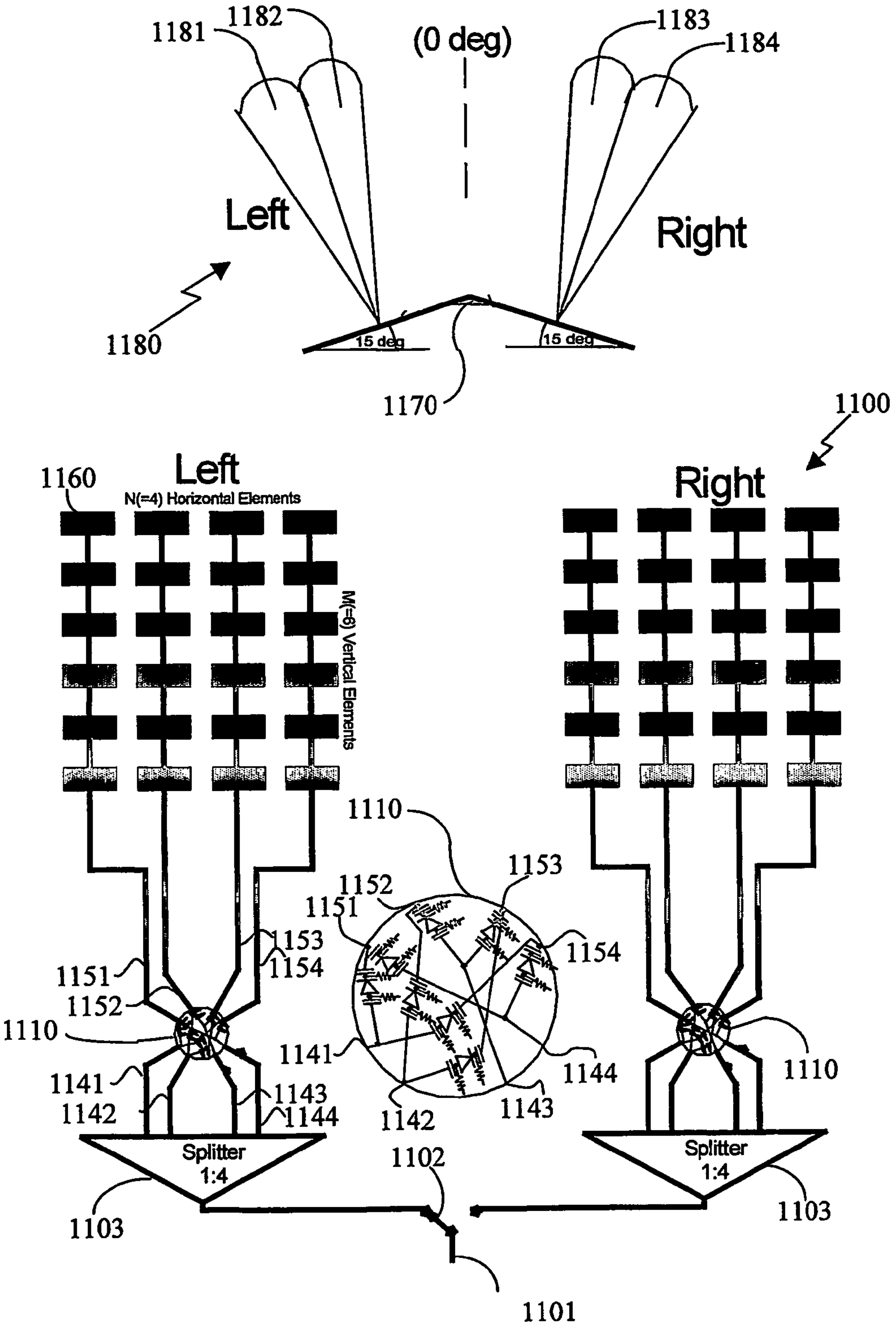
FIG. 11 schematically presents a four beam switched phased array, characterized by an N×M arrayed antenna construction.

Reference is made now to FIG. 11, presenting a novel system and method according to one embodiment of the present invention for mirroring a plurality of main beam lobes created by the antenna assembly as defined and described in any of the above. The upper portion of FIG. 11 is a schematic top view of a four beam switched phased array (1180) characterized by an N×M arrayed antenna construction. There are K Array plates (wherein K is an integer number from 1 to k), consisting of N by M elements; wherein N is denoted for the horizontal elements (wherein N is an integer number, and further wherein $N \geqq 2$) and wherein M is denoted for the vertical elements (wherein M is an integer number and further wherein $M \geqq 1$).

It is acknowledged in this respect that the mirroring could be provided along any axis of the plate that includes the element array, and not only perpendicular to it. Purely for the simplicity of the explanation, perpendicular mirroring is provided. FIG. 11 presents a K=2 array, which is characterized by a V shaped orientation. Here, the angle θ (1170) between the two plates of the mechanical construction equals 150 degrees. Each of the left and right doubled lobes (1181, 1182 on the left and 1183, 1184 on the right) covers each 22.5 degrees and enables the beam to cover four continuous interval states of 15 degrees. Hence, three adjacent plates with the same angle between every two are adapted to enable 90 degrees coverage with six beams. Alternatively, three adjacent plates with 120 degrees between the two plates are adapted to enable 180 degrees coverage with six beams of 30 degrees width. Moreover, swapping of two beams will form four beams in one plate; for this an extension of the switch matrix and addition of another 1:4 power splitter (1103) is required.

The horizontal element or elements are made of combinations of patches, slots, dipoles etc., with any kind of feeding, e.g., serial, parallel, etc. The vertical elements could be of any kind, and may further be comprised of patches, dipoles, slots or any combination thereof. The connection between the elements could be serial or parallel or both serial and parallel.

Reference is still made to FIG. 11, showing a scheme of the electronic system of the aforesaid four beams 4 by 6 arrayed antenna (1100); wherein RF input/output (1101) is transferred via an RF switch (1102) and 1:4 splitter modules (1103) towards the left and right portions of the antenna. Hence, four inlets enter the switching modules (1110), namely 1141-1144. By means of an array of 4 diodes providing a communication root characterized by a single diode per root as described in switching modules (1110), four outlets (namely 1151-1154) are in communication with the elements of the said antenna array (1160).

The advantages of antenna (1100) and the like lie in saving switches, and reducing insertion loss, wherein only one switch is used in series to the RF path. It is acknowledged in this respect that a RF switch may cost about one dollar, so a significant reduction of the device's costs is hereto provided. Moreover, each such a RF switch increases the insertion loss by about 1 dB. The novel switching modules (1110) provides for one switch per root, and hence eliminates about 50% of losses due to the existence of a series of switches per root.

Figure 12:
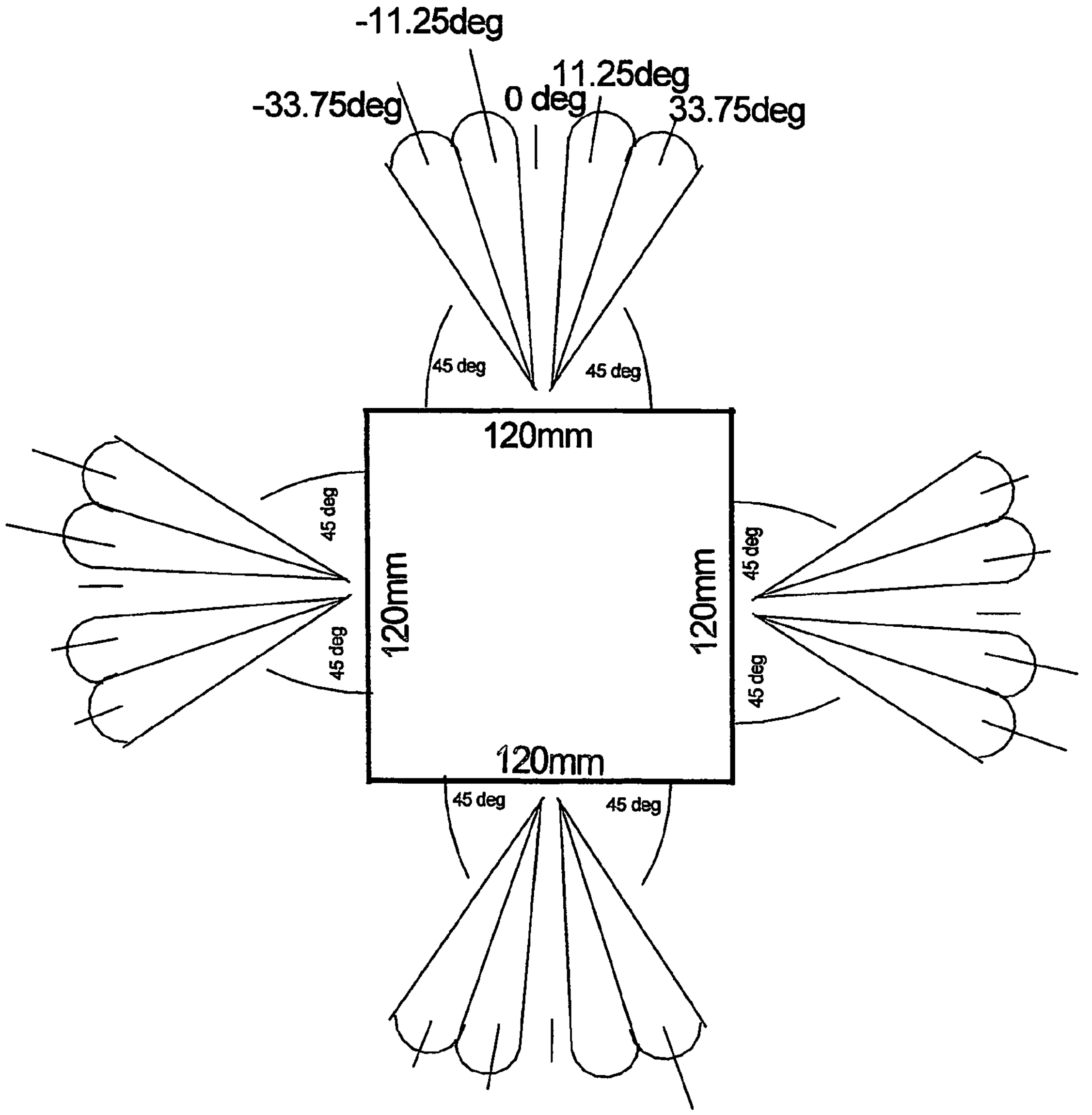
FIG. 12 schematically presents a second novel system and method according to yet another embodiment of the present invention for mirroring a plurality of beams; and, FIG. 13 schematically presents a third novel system and method according to another embodiment of the present invention for mirroring a plurality of beams.

Reference is made now to FIG. 12, which illustrates a second novel system and method according to yet another embodiment of the present invention for mirroring a plurality of beams. The swapping between two beams is performed by switching a matrix, which is an extension of the aforesaid switching modules (1110), additionally comprising 1:4 splitter (1103). Here, angle θ is of 90 degrees, enabling the mirrored beams to cover four continuous interval states of 25 degrees. According to another embodiment of the present invention, four adjacent plates are provided for forming a square shape, which enables 90 degrees coverage with four beams.

Figure 13:
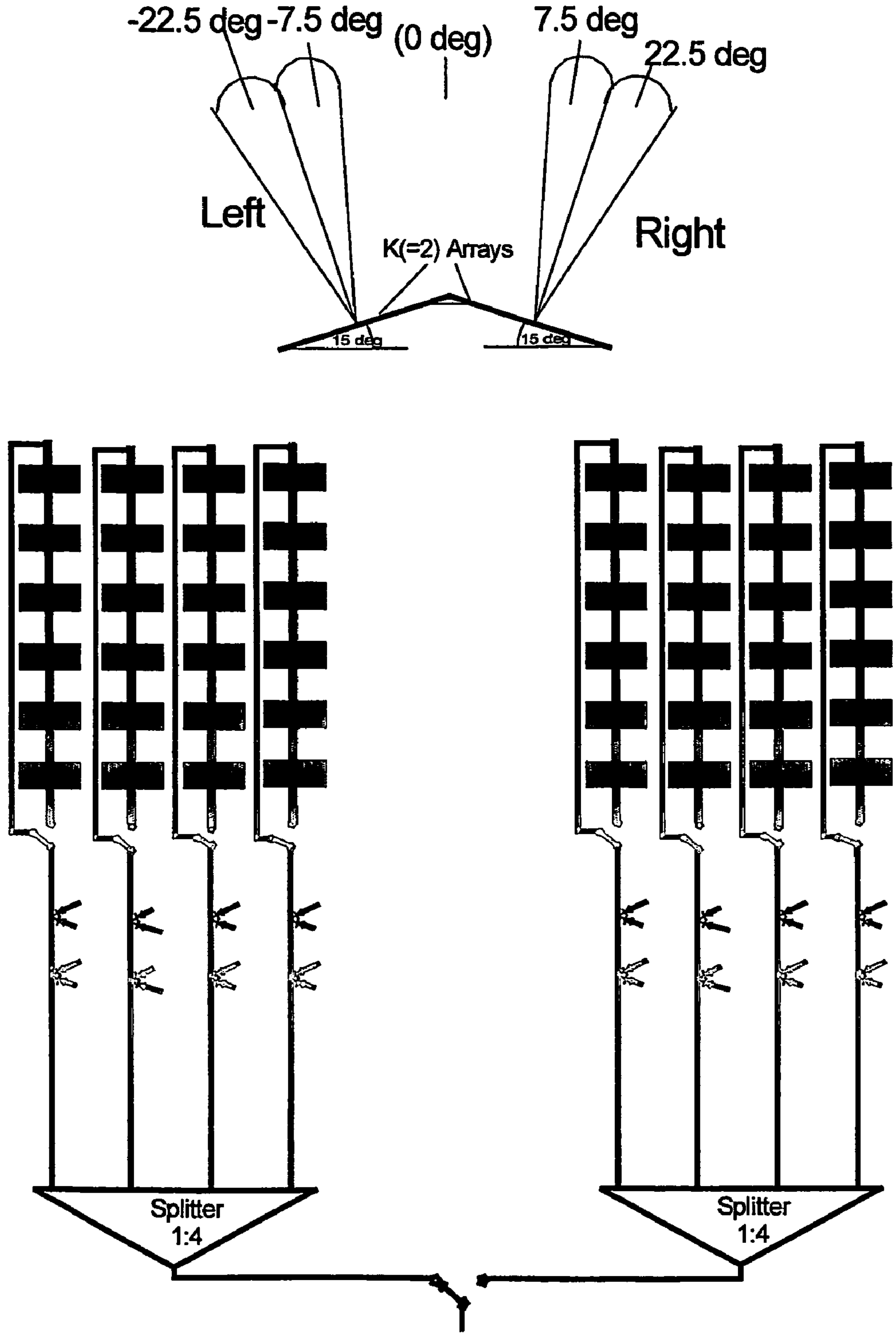

Reference is made now to FIG. 13, which illustrates a third novel system and method according to another embodiment of the present invention for mirroring a plurality of beams. The swapping between the two beams is performed by switching stabs, utilizing one or more commercially available double-pole double-throw (DPDT) switches.

The invention claimed is:

1. A phased array antenna assembly, adapted for reducing severe radiation hazards to the human body, useful for transmitting and receiving signals while taking into account the indoor electromagnetic field strength, said antenna design comprising:

a micro-strip small-size antenna;

a switching device, having a communicating means with said antenna to select between receiving or transmitting modes, further having a selecting means for phase shift and the receiving/transmitting frequencies;

a controller adapted to receive inputs from said switching device comprising:

coordinating means, adapted to interconnect said switching device with a algorithm-based software; and memory queue that records the optimal path in each indoor environment to each of the associated nodes to said antenna assembly; and, an ASIC protocol adapted to control said phased array antenna assembly, said ASIC protocol comprising the following steps:

scanning with the first beam for the first station;

receiving a signal and writing the RSSI;

proceeding to the next beam direction;

getting a maximum RSSI or received field strength from said station;

calculating the station's virtual distance from said antenna and adjusting the power level to the correct one;

registering the obtained RSSI and/or level in a memory, wherein said obtained RSSI and/or level is associated with the beam direction and with the station ID; and scanning for a plurality of other stations as required;

wherein said assembly is cost effective in the manner it is adapted for a indoor mass-utilization consisting of low cost materials and components, and wherein said assembly radiate a limited electromagnetic field in a minimal measure required for communication, and further wherein said ASIC protocol controls the antenna operation in the manner that the antenna is adapted to fit with any RF protocol.

2. The antenna assembly according to claim 1, adapted to proceed with other receiving and/or transmitting tasks.

3. The antenna assembly according to claim 1, characterized by that antenna used is a cell-wall socket (CWS).

4. The antenna assembly as defined in claim 1, adapted for mirroring a plurality of main beam lobes, wherein the symmetry of the mirrored beams is referred to a predetermined axis of the plate that comprises the element array, and further wherein said antenna assembly is adapted for mirroring L beam lobes, L being any positive even integer, comprising:

a plurality of RF inputs/outputs;

a plurality of RF switches;

1:L splitter modules; and, an array of n by in elements with any polarization desired by the user.

5. The phased array antenna according to claim 4, additionally comprising at least one switching module.

6. The phased array antenna according to claim 5, wherein at least a portion of said switching modules is in series.

7. The phased array antenna according to claim 5, wherein at least a portion of said switching modules is in parallel.

8. The phased array antenna according to claim 5, wherein the switching module is an electronic circuit comprising inter alia a plurality of p RF signal inlets, a plurality of q RF signal outlets and a plurality of p+q diodes, p and q being any positive integers, in such a manner that each of said p+q diodes interconnects one of the q inlets with n outlets, n being any positive integer such that $1 \leqq n \leqq q$.

9. The phased array antenna according to claim 8, wherein p=q =2n.

10. The phased array antenna according to claim 5, wherein the switching module is an electronic circuit comprising inter alia a plurality of p RF signal inlets, a plurality of q RF signal outlets and a plurality of p+q−1diodes, q and p being any positive even integers, and further wherein each of said p+q diodes interconnects one of the q inlets with n outlets, such that $1 \leqq n \leqq q$, and further wherein at least one beam is not mirrored.

11. The phased array antenna according to claim 5, wherein the switching module is an electronic circuit comprising inter alia a plurality of q+1 RF signal inlets, a plurality of q+1 RF signal outlets and a plurality of (p+1)q diodes, q being any even integer in such a manner that each of said pq diodes interconnects one of the q inlets with p outlets; p being an integer such that $1 \leqq p \leqq q$ and further wherein a single central beam is not mirrored.

12. The antenna assembly as defined in claim 1, said assembly comprising:

a plate comprising the element array;

a predetermined axis of said plate;

p RF input/outputs;

q inlets;

a plurality of p+q diodes;

interconnection of each of said q inlets with j outlets by means of each of said p+q diodes;

at least one RF switch;

a plurality of 1:L splitter modules;

an array of n by m elements with any polarization desired by the user; and, a plurality of s switching modules adapted for mirroring said plurality of L main beam lobes;

wherein s, L, D denote the signal, beam and diodes, and further wherein n, m, i and j are any positive integer numbers, and so that is=2iB=4iD, and further wherein the symmetry of the mirrored beams is referred to a predetermined axis of said plate, and further wherein said antenna assembly is adapted for mirroring a plurality of L main beam lobes.

* * * * *